(12) United States Patent
Bauer et al.

(10) Patent No.: US 7,934,393 B2
(45) Date of Patent: May 3, 2011

(54) PROCESS FOR RECYCLING GLASS FIBER

(75) Inventors: Jon Frederick Bauer, Castle Rock, CO (US); Susan McMillin Gee, Littleton, CO (US); Kurt A. Lintelmann, Centennial, CO (US)

(73) Assignee: Johns Nanville, Denver, CO (US)

( * ) Notice: Subject to any disclaimer, the term of this patent is extended or adjusted under 35 U.S.C. 154(b) by 786 days.

(21) Appl. No.: 11/810,420

(22) Filed: Jun. 5, 2007

(65) Prior Publication Data
US 2008/0302136 A1 Dec. 11, 2008

(51) Int. Cl.
*C03C 25/70* (2006.01)

(52) U.S. Cl. .......................... 65/473; 134/115; 134/116

(58) Field of Classification Search .................... 65/473; 134/115, 116
See application file for complete search history.

(56) References Cited

U.S. PATENT DOCUMENTS

| | | | | |
|---|---|---|---|---|
| 3,847,664 A * | 11/1974 | Gravel | ............................. | 134/2 |
| 3,990,908 A * | 11/1976 | Caropreso et al. | ................. | 134/2 |
| 4,139,357 A * | 2/1979 | Brodmann et al. | ............ | 65/30.1 |
| 4,300,955 A * | 11/1981 | Yount | ................. | 134/3 |
| 4,462,815 A * | 7/1984 | Propster et al. | ................. | 65/473 |
| 5,019,171 A * | 5/1991 | Hanson et al. | .................... | 134/2 |
| 5,484,487 A * | 1/1996 | Motsenbocker | .................. | 134/6 |
| 5,495,015 A * | 2/1996 | Bassler et al. | ................. | 540/540 |
| 5,582,650 A * | 12/1996 | Simons | ................. | 134/1 |
| 5,772,777 A * | 6/1998 | Vallet et al. | ....................... | 134/2 |
| 6,454,873 B1 * | 9/2002 | Mulligan et al. | ................ | 134/10 |
| 6,793,737 B2 * | 9/2004 | Yount | .............................. | 134/3 |

* cited by examiner

*Primary Examiner* — John Hoffmann
(74) *Attorney, Agent, or Firm* — Robert D. Touslee

(57) ABSTRACT

An effective process for removing organic coatings and binders from glass fiber surfaces in a manner that is both environmentally friendly and does not comprise the integrity or physical properties of the fiber.

21 Claims, 1 Drawing Sheet

PROCESS FOR RECYCLING GLASS FIBER

FIELD OF ART

The present disclosure relates to a process for recycling glass fiber from bonded mat and other resin-coated fiber materials.

BACKGROUND

Each year the glass industry loses to landfills millions of pounds of fiber, and resultantly millions of dollars of potential product, because of the inability of scrap or waste product to be recycled. Losses to landfills are especially true for fiber made for use in glass fiber mat, such as that commonly used to provide network support to roofing shingles. The main problem associated with re-use of glass fiber mat scrap or waste product, and specifically glass fiber mat used to provide network support to roofing shingles, is the often heavy coating of resinous organic material on the fiber, which can comprise up to 20 weight % of the product. The resin can be cured (fully polymerized), uncured, or partially cured; its primary functions are to coat the individual glass fibers to provide surface protection, dispersion capability or other functions related to "sizing" of the fibers, and to eventually "glue" or bind the individual fibers together to form the mat. The most common resins used as binders are urea-formaldehyde based. Other resins, such as acrylic or melamine-formaldehyde, are also used in the industry. Some of the waste fibers are generated during production during filament breakouts or in the generation of product that does not meet specifications. Waste product is typically never used to make mat and usually ends up as "basement scrap"—wet, sticky fiber that is sent directly to landfill. Other waste or scrap fiber, which can be somewhat easier to handle as the binder is often cured and the material has some integrity, can be generated during mat production as edge trim, off-specification roll goods, or the result of process upsets.

Very small amounts of waste or scrap fiber that has some integrity, which typically comprises cured binder, can be recycled into a glass melter used in the production of fiber for glass mat. However, the high organic (resin) content of the waste fiber is combustible and upsets the redox control of the furnace of the glass melter. A typical E glass batch used in the production of fiber for glass mat can only handle about 1-2 weight % of resin. Alternatively, fiber could be recycled back into the fiber mat-forming machine, but to do so would require that the fiber be liberated from and undamaged by the resinous binder that coats and holds the fibers together. Coated or bonded fibers cannot be dispersed into the forming waters and would result in unacceptable product if allowed to end up in the final mat product.

Several methods have been used in the past to "de-bond" fiber in waste material. The easiest is incineration, which can burn off resins of any type. However, the high temperatures required for incineration embrittle the fiber and make the fiber useless as feedstock for mat machines. As a result, incinerated fibers must be sent to landfill.

Other methods to "de-bond" fiber in waste material involve extraction of the binder with acid solutions. For example, U.S. Pat. No. 4,300,955 discloses removing a coating of urea-formaldehyde resin from spun fiberglass with an aqueous phosphoric acid solution, with the fiberglass product subsequently rinsed, dried and chopped for reuse. U.S. Pat. No. 6,454,873 discloses a process and apparatus for recovering clean fiberglass and urea formaldehyde from urea formaldehyde treated waste fiberglass, wherein waste fiberglass passes through acid and wash loops in which the recovery takes place. U.S. Pat. No. 6,793,737 discloses a method for reclaiming fiberglass and a resinous residue from resinous fiberglass product, the method comprising first introducing the resinous fiberglass product to a single chamber or multichamber washer/extractor machine; an aqueous acid solution is then used to remove the resinous residue from the resinous fiberglass product; the fiberglass portion is then rinsed, dewatered, and stored for later use; at the same time, the resinous residue is recovered by precipitating the resinous residue out of the acid solution bath and separating it using a clarifier; the fiberglass portion is then available for reuse in the glass industry and other end use applications and the resinous residue may then be available for use in many other industries.

While extraction removes binders and coatings, the acid solutions employed also react with the glass fiber surface, especially the glass fiber surfaces of E glass fibers, leaching glass components such as calcium, boron, and alkali from the glass fibers. The net result is embrittlement and weakening of the fibers, such that only limited amounts of fibers can be recycled back into mat-forming processes without compromise to the physical properties of the mat.

Other methods that have been used to create binder-free, recyclable glass fiber include low temperature oxidation, and swelling and peeling away the binder with organic solvents. The former is a very slow and mostly ineffective process, leaving too much of the organic content behind on the fiber, while the latter involves use of large amounts of environmentally hazardous liquids that create a recycle problem in themselves.

What is needed is an effective process for removing organic coatings and binders from glass fiber surfaces in a manner that is both environmentally friendly and does not compromise the integrity or physical properties of the fiber.

SUMMARY

Provided is a method of removing an organic coating and/or binder from glass fibers. The method comprises introducing glass fibers comprising an organic coating and/or binder into a hydrothermal reactor. Pressure is generated in the reactor by introducing a water-based fluid into the reactor and heating the reactor sufficiently to remove the organic coating and/or binder from the glass fibers.

Also provided is a method of producing glass fiber mat using organic-coated and/or bonded glass fibers. The method comprises introducing glass fibers comprising an organic coating and/or binder into a hydrothermal reactor. Pressure is generated in the reactor by introducing a water-based fluid into the reactor and heating the reactor sufficiently to remove the organic coating and/or binder from the glass fibers. The glass fibers are removed from the reactor. The glass fibers are fed into a mat-forming machine.

BRIEF DESCRIPTION OF THE DRAWING FIGURES

DETAILED DESCRIPTION

Figure 1:
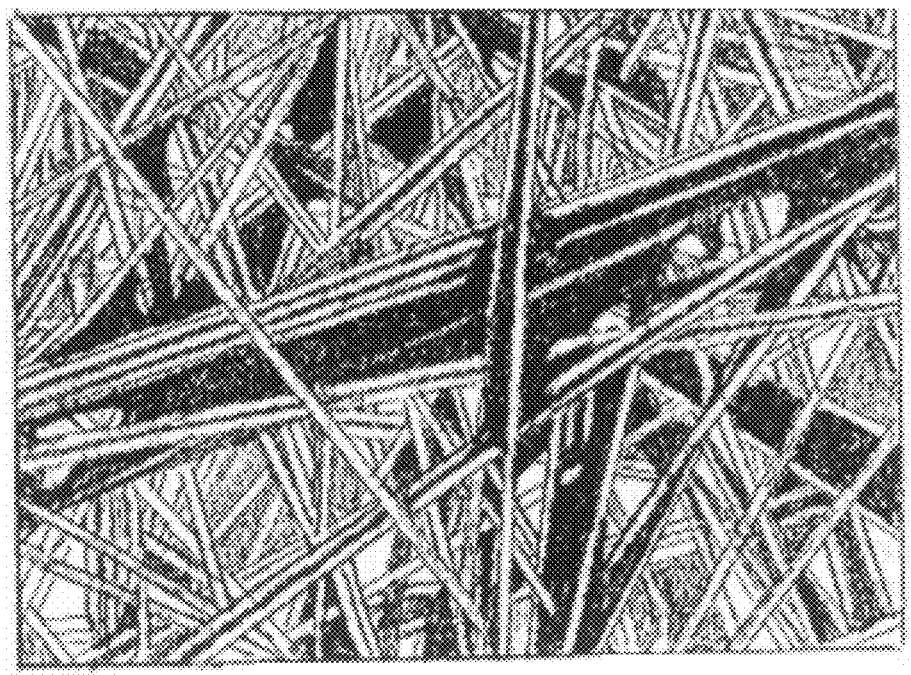
FIG. 1 illustrates a typical collection of E glass fibers bonded together using urea-formaldehyde (UF) resin to form a mat that can be used commercially in the production of roofing shingles.

Provided is an effective process for removing organic coatings and binders from glass fiber surfaces in a manner that is both environmentally friendly and does not compromise the integrity or physical properties of the fiber. Virtually 100% of the scrap fiber feedstock to the process can be re-used as fiber in glass mat production. The process is based on the effective use of water, for example, high pressure steam, to essentially swell the binders and coatings, such that the binders or coatings pull away harmlessly from the fiber surfaces, then dissolve or suspend in the water to be safely washed away. Without wishing to be bound by theory, it is believed that high pressure steam reacts with the resin(s), while not reacting with the glass or glass fiber. The process can be auto catalytic and self propagating by using the coatings and binders themselves as the fuel for the process reactor. Some amount of oxidation can occur in the processing of waste or scrap bonded fiber, such that the de-bonding process can be made more effective and the small amounts of residual organic matter left behind can be oxidatively cleaned to make the fiber surfaces even more organic free than by using water alone.

The process involves the following general steps: (1) collection of waste, bonded fiber into a hydrothermal batch reactor; (2) introduction of water into the reactor at a rate or volume sufficient to generate the pressure of interest; (3) heating the reactor externally to achieve the desired temperature—water or steam pressure is then dictated by the temperature, the volume of the reactor, and the amount of water used; (4) holding the reactor at the desired temperature or pressure until the binder has been dissolved away from the glass fiber—typically from ten minutes to four hours, depending on the temperature and pressure; (5) cooling the reactor and allowing the steam to condense into a collection vessel, carrying with it the dissolved and suspended solids from the binder; (6) removing the de-bonded fibers and washing them in water to remove any residual surface material; and (7) re-feeding the fiber directly into the mat-forming machine.

In step (1), a continuous rather than batch hydrothermal reactor can be employed. In the case of a continuous reactor, fiber can be mixed directly with steam injected from a high pressure pump. The steam plus bonded fiber then provide the feedstock to the reactor. The reactor can be tubular and contain a variety of internal mixers or can be capable of rotation to enhance percolation of steam though the fiber network.

In step (2), oxygen or air can be introduced directly into the steam to enhance oxidative reactions. The gasses can be injected directly into the reactor or dissolved initially in the water. Hydrogen peroxide can be introduced into the water to provide greater capability for oxidation of the binders and coatings.

In step (3), heat can be supplied by pre-heating the water to form steam and the steam then directly injected into the reactor. In step (5), the aqueous liquid containing the binder materials can be further removed from the fiber by vacuum separation (suction) after the reactor has returned to normal atmospheric pressure. Exemplary conditions of the reactor include a temperature of about 200° C., a pressure of about 15.5 bar, and a residence time of about 2 hours.

Accordingly, described herein is a process for removing polymerized and unpolymerized organic coatings from glass fiber surfaces such that the fibers can be recycled and used directly as feedstock in the production of new glass fiber mat. The process preferably does not damage the fiber or render the fiber too weak or brittle to be used in new mat production. The process preferably employs a hydrothermal process on organically coated or bonded glass fiber and glass mat waste materials. The specific temperatures and pressures of the process are chosen to match the particular type of glass and the particular type of binder in the waste material. In general, steam temperatures can range from about 100 to about 350° C. and steam pressures range from about 4 to about 250 bar. An oxidative agent including air, oxygen, or hydrogen peroxide can be added to enhance the de-bonding and oxidation of the organic coatings. The reaction can be heated, either in part or totally, by exothermic oxidative reactions involving decomposition of the binder. The organic coatings on the glass fiber can contain an assortment of silanes, lubricants, surfactants and other organic and polymeric materials conventionally used in commercial sizing and continuous filament glass fiber production. The organic binders and coatings can be derived from urea-formaldehyde resins, melamine-formaldehyde resins, acrylic resins, or other polymeric resins used commercially to bond fiber glass into mat form. The glass fiber can be comprised of E glass, C glass, T glass, or compositional variations thereof.

EXAMPLE

The following illustrative example is intended to be non-limiting. A comparison of results obtained from the presently claimed methods and the method disclosed in U.S. Pat. No. 6,793,737 was made. In particular, the presently claimed method was performed using a reactor temperatures of 150° C. to 250° C., pressures of 4.5 to 33 bar, and residence time of 1 to 4 hours, and the method disclosed in U.S. Pat. No. 6,793,737 was performed using 10 to 50 volume % phosphoric acid in water and a reactor temperature of 93° C. (200° F.) and residence time of 0.5 hours.

As noted above, the acid solution employed in the method disclosed in U.S. Pat. No. 6,793,737 reacts with the glass fiber surface leaching glass components from the glass fibers. Thus, Table 1, below, shows a comparison of the amount of organic removed (i.e., efficiency of coating or binder removal) and the amount of glass dissolved (i.e., damage to the glass) according to each of the methods.

TABLE 1

| Method | Temperature (° C.) | Pressure (atm) | Medium | % $Al_2O_3$ Leached from Fiber | Total Nitrogen Removed | Total Carbon Removed | Residual Fiber Surface Condition | Residual Fiber Strength |
|---|---|---|---|---|---|---|---|---|
| Hydrothermal | 150 | 4.5 | 5% $H_2O_2$ in Water | 0.004 | 92% | 100% | Mostly (>98%) Clean | Strong |
| Hydrothermal | 250 | 33 | 5% $H_2O_2$ in Water | 0.014 | 32%[2] | 67%[3] | Clean | Strong |
| Acid Leach[1] | 200 | 1 | 10% $H_3PO_4$ | 0.14 | 95% | 60% | Residual Binder and Redeposited Calcium | Brittle |

TABLE 1-continued

| Method | Temperature (° C.) | Pressure (atm) | Medium | % Al$_2$O$_3$ Leached from Fiber | Total Nitrogen Removed | Total Carbon Removed | Residual Fiber Surface Condition | Residual Fiber Strength |
|---|---|---|---|---|---|---|---|---|
| Acid Leach[1] | 200 | 1 | 50% H$_3$PO$_4$ | 0.28 | 79% | 80% | Phosphate Present Residual Binder and Redeposited Calcium Phosphate Present | Brittle |

Figure 2:
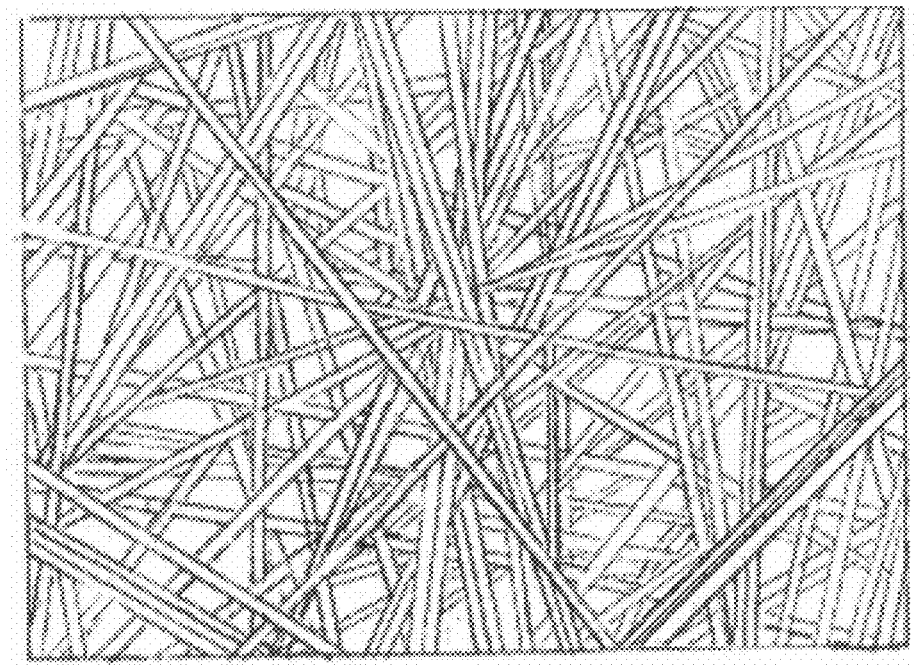
FIG. 2 illustrates a collection of fibers from the mat of FIG. 1 after exposure to hydrothermal conditions.

[1] Per U.S. Pat. No. 6,793,737
[2] Most nitrogen lost as NH$_3$
[3] Most carbon lost as CO$_2$ The amounts of Al$_2$O$_3$, nitrogen and carbon removed were determined by chemical analysis of the residual liquids (including dissolved and suspended solids) and surface condition was assessed via scanning electron microscope analysis as illustrated in FIGS. 1 and 2. FIG. 1 illustrates a typical collection of E glass fibers bonded together using UF resin to form a mat that can be used commercially in the production of roofing shingles. FIG. 2 illustrates a collection of fibers from the mat of FIG. 1 after exposure to hydrothermal conditions of 200° C. and 15.5 bar of pressure for two hours. FIG. 2, and the results presented in Table 1, indicate that all of the binding webs of UF resin seen in FIG. 1 were removed. Thus, the fibers are no longer stuck together, but are free to be dispersed into new glass fiber mat.

As shown in Table 1, and FIGS. 1 and 2, the presently disclosed hydrothermal methods are quite efficient at removing organic components of glass fiber mat, but unlike methods employing acid treatment, do not remove key glass components, such as, for example, Al$_2$O$_3$, which is a major "backbone" component of the glass structure. As a result, fibers recovered from the hydrothermal treatment retain most, if not all, of their original strength, while acid treated fibers are embrittled. Only limited amounts of embrittled acid treated fiber could be recycled (as fiber) back into a mat-forming process without compromising the strength and other physical properties of the resulting mat. By contrast, virtually all of the hydrothermally treated fiber is reuseable. Further, at higher temperatures and pressures, the hydrothermal process effectively oxidizes much of the organic binder to ammonia and carbon dioxide, which can be evident from the residual odor of the recovered liquid. The (unbalanced) reaction which occurs in the reactor is essentially as follows:

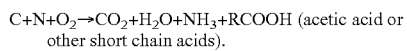

$$C + N + O_2 \rightarrow CO_2 + H_2O + NH_3 + RCOOH \text{ (acetic acid or other short chain acids)}.$$

While the total amount of carbon and nitrogen in the recovered solutions cannot always be used to quantitate the amount of binder removed from the fiber surfaces, the waste stream of the presently disclosed hydrothermal method is easily-manageable, reuseable, and environmentally friendly, unlike the waste stream produced in U.S. Pat. No. 6,793,737, which is highly corrosive (acidic) and contains large quantities of phosphate, which can be detrimental to the environment. Thus, the effluent waste stream created by the presently disclosed methods is preferably free of phosphate and acid and comprises dissolved carbon and nitrogen in a form that is environmentally non-hazardous. Accordingly, the effluent waste stream created by the presently disclosed methods is readily useable as organic fertilizer or other similar useful products.

While various embodiments have been described, it is to be understood that variations and modifications can be resorted to as will be apparent to those skilled in the art. Such variations and modifications are to be considered within the purview and scope of the claims appended hereto.

The invention claimed is:

1. A method of removing an organic coating and/or binder from glass fibers comprising:
   introducing glass fibers comprising an organic coating and/or binder into a hydrothermal reactor;
   introducing a water-based fluid into the reactor and heating to a reactor temperature in a range of from about 100° C. to about 350° C. and a pressure in the reactor of about 10 to about 250 bar, to thereby remove the organic coating and/or binder from the glass fibers.

2. The method of claim 1, wherein the organic coating and/or binder is removed from the glass fibers in a time frame of from about ten minutes to about four hours.

3. The method of claim 1, wherein the hydrothermal reactor is a batch reactor.

4. The method of claim 1, wherein the hydrothermal reactor is a continuous reactor.

5. The method of claim 4, wherein introducing glass fibers comprising organic coating and/or binder into the hydrothermal reactor and introducing the water-based fluid into the reactor comprises mixing the glass fibers with steam injected from a high pressure pump.

6. The method of claim 1, wherein the reactor is tubular and comprises a variety of internal mixers and/or is capable of rotation to enhance percolation of steam though the glass fibers.

7. The method of claim 1, further comprising introducing oxygen, air, and/or hydrogen peroxide into the reactor.

8. The method of claim 7, wherein the oxygen, air, and/or hydrogen peroxide are introduced into the reactor with the water-based fluid.

9. The method of claim 1, wherein the water-based fluid comprises steam.

10. The method of claim 1, further comprising separating the water-based fluid and organic coating and/or binder from the glass fibers by vacuum separation after the reactor has returned to normal atmospheric pressure.

11. The method of claim 1, wherein the reactor is heated to a temperature of about 200° C., a pressure of about 15.5 bar is generated in the reactor, and the organic coating and/or binder is removed from the glass fibers in a time frame of about two hours.

12. The method of claim 1, wherein the reactor is heated by exothermic oxidative reactions involving decomposition of the organic coating and/or binder.

13. The method of claim 1, wherein the organic coating and/or binder comprises one or more materials selected from the group consisting of silanes, lubricants, surfactants, and mixtures thereof.

14. The method of claim 1, wherein the organic coating and/or binder are derived from a resin selected from the group consisting of urea-formaldehyde resins, melamine-formaldehyde resins, acrylic resins, and mixtures thereof.

15. The method of claim 1, wherein the glass fibers comprise glass fibers selected from the group consisting of E glass fibers, C glass fibers, T glass fibers, and mixtures thereof.

16. The method of claim 1, further comprising cooling the reactor.

17. The method of claim 1, further comprising:
   collecting the water-based fluid and organic coating and/or binder separate from the glass fibers;
   removing the glass fibers from the reactor; and
   washing the glass fibers with water.

18. The method of claim 1, further comprising recovering an effluent waste stream, wherein the effluent waste stream is free of phosphate and acid and comprises dissolved carbon and nitrogen.

19. The method of claim 18, wherein the effluent waste stream is readily useable as fertilizer.

20. A method of producing glass fiber mat using organic-coated and/or bonded glass fibers comprising:
   introducing glass fibers comprising an organic coating and/or binder into a hydrothermal reactor;
   introducing a water-based fluid into the reactor and
   heating to a reactor temperature in a range of from about 100° C. to about 350° C. and a pressure in the reactor of about 10 to about 250 bar, to thereby remove the organic coating and/or binder from the glass fibers;
   removing the glass fibers from the reactor; and
   feeding the glass fibers into a mat-forming machine.

21. The method of claim 20, further comprising, prior to removing the glass fibers from the reactor, collecting the water-based fluid and organic coating and/or binder separate from the glass fibers.

\* \* \* \* \*